(12) United States Patent
Sano et al.

(10) Patent No.: US 11,306,915 B2
(45) Date of Patent: Apr. 19, 2022

(54) CEMENT KILN BURNER DEVICE AND METHOD FOR OPERATING THE SAME

(71) Applicant: Taiheiyo Cement Corporation, Tokyo (JP)

(72) Inventors: Yuya Sano, Sakura (JP); Kana Horiba, Sakura (JP); Kouichi Naitou, Tokyo (JP)

(73) Assignee: Taiheiyo Cement Corporation, Tokyo (JP)

( * ) Notice: Subject to any disclaimer, the term of this patent is extended or adjusted under 35 U.S.C. 154(b) by 0 days.

(21) Appl. No.: 16/643,155

(22) PCT Filed: Sep. 26, 2018

(86) PCT No.: PCT/JP2018/035777
§ 371 (c)(1),
(2) Date: Feb. 28, 2020

(87) PCT Pub. No.: WO2020/065787
PCT Pub. Date: Apr. 2, 2020

(65) Prior Publication Data
US 2021/0222874 A1    Jul. 22, 2021

(51) Int. Cl.
*F23D 99/00*    (2010.01)
*F23D 1/02*    (2006.01)
(Continued)

(52) U.S. Cl.
CPC ............... *F23D 91/02* (2015.07); *F23D 1/02* (2013.01); *F23L 1/00* (2013.01); *F27B 7/34* (2013.01);
(Continued)

(58) Field of Classification Search
CPC ........ F23D 91/02; F23D 1/02; F23D 2201/20; F23D 2204/00; F23D 2900/01001; F23L 1/00; F27B 7/34; F27B 7/36
(Continued)

(56) References Cited

U.S. PATENT DOCUMENTS 3,989,443 A * 11/1976 Campbell ............... F23D 17/00
431/8
4,425,159 A * 1/1984 Nixon ....................... C01B 3/36
431/4
(Continued)

FOREIGN PATENT DOCUMENTS

JP    S61-101226 U    6/1986
JP    2001-012705 A    1/2001
(Continued)

OTHER PUBLICATIONS

"JP_2009079794_A_M—Machine Translation.pdf", machine translation, EPO.org, May 22, 2021. (Year: 2021).*
(Continued)

*Primary Examiner* — Steven B McAllister
*Assistant Examiner* — Daniel E. Namay
(74) *Attorney, Agent, or Firm* — Knobbe, Martens, Olson & Bear, LLP

(57) ABSTRACT

A cement kiln burner device includes a powdered-solid-fuel flow channel having means for swirling a powdered-solid-fuel flow; a first air flow channel placed inside the powdered-solid-fuel flow channel to be adjacent to the powdered-solid-fuel flow channel having means for swirling an air flow; a second air flow channel placed in an outermost side outside the powdered-solid-fuel flow channel having means for straightly forwarding an air flow; and a combustible-solid-waste flow channel placed inside the first air flow channel. The second air flow channel is divided in a cir- (Continued)

cumferential direction into four or more opening portions adapted to form ports for injecting air flows, and is configured to control flow rates of the air flows ejected from the opening portions, independently for each opening portion.

4 Claims, 10 Drawing Sheets

(51) Int. Cl.
  *F23L 1/00* (2006.01)
  *F27B 7/34* (2006.01)
  *F27D 99/00* (2010.01)
(52) U.S. Cl.
  CPC ...... *F23D 2201/20* (2013.01); *F23D 2204/00* (2013.01); *F23D 2900/01001* (2013.01); *F27D 2099/0051* (2013.01)
(58) Field of Classification Search
  USPC .................................................... 431/9, 187
  IPC .......... F23D 1/02; F27B 7/36,7/34; F23L 1/00
  See application file for complete search history.

(56) References Cited

U.S. PATENT DOCUMENTS

| | | | | |
|---|---|---|---|---|
| 4,523,530 | A * | 6/1985 | Kaminaka | F23D 17/005 110/264 |
| 4,902,221 | A * | 2/1990 | Collins, Jr. | F23D 1/02 110/263 |
| 5,762,486 | A * | 6/1998 | Leger | F23D 11/104 431/8 |
| 6,142,764 | A * | 11/2000 | Anderson | F23D 14/32 431/8 |
| 6,890,498 | B2 * | 5/2005 | Tsiava | C01B 17/0417 423/220 |
| 7,717,701 | B2 * | 5/2010 | D'Agostini | F23C 6/045 431/9 |
| 8,353,698 | B2 * | 1/2013 | Moberg | B01J 19/26 431/187 |
| 2007/0231761 | A1 * | 10/2007 | Rosen | F23L 7/007 431/350 |
| 2009/0226852 | A1 * | 9/2009 | Feese | F23D 14/60 431/9 |
| 2009/0280442 | A1 * | 11/2009 | Varagani | F23C 9/003 431/2 |
| 2010/0050912 | A1 * | 3/2010 | Mersmann | F23N 5/082 110/186 |
| 2010/0162930 | A1 | 7/2010 | Okazaki et al. | |
| 2012/0210917 | A1 * | 8/2012 | Belasse | F23M 5/025 110/347 |
| 2014/0322658 | A1 * | 10/2014 | Goldring | F23D 1/00 431/8 |
| 2021/0054996 | A1 * | 2/2021 | Sano | F23G 5/444 |
| 2021/0222875 | A1 * | 7/2021 | Sano | F23L 1/00 |

FOREIGN PATENT DOCUMENTS

| | | |
|---|---|---|
| JP | 2003-279003 A | 10/2003 |
| JP | 2009079794 A | 4/2009 |
| JP | 2013-237571 A | 11/2013 |
| JP | WO2014/014065 A1 | 1/2014 |
| JP | 2015-190731 A | 11/2015 |
| KR | 10-2010-0061472 A | 6/2010 |
| WO | 2009/034626 A1 | 3/2009 |
| WO | 2009/125566 A1 | 10/2009 |

OTHER PUBLICATIONS

"WO_2009034626_A1_M—Machine Translation.pdf", machine translation, EPO.org, May 22, 2021. (Year: 2021).*
Japanese Office Action for the Application No. 2019-534764, dated Apr. 3, 2020 in 10 pages. (English Translation included).
International Search Report for PCT Application No. PCT/JP2018/035777, dated Nov. 27, 2018 in 3 pages.
Chinese Office Action for Chinese Patent Application No. 201880048543.7 dated Feb. 24, 2021 in 17 pages including English translation.
Korean Office Action issued for Korean Patent Application No. 10-2020-7000357, dated May 18, 2021 in 8 pages including English translation.
Korean Office Action issue for Korean Patent Application No. 10-2020-7000357, dated Sep. 28, 2021 in 6 pages including English translation.
Chinese Office Action issued for Chinese Patent Application No. 201880048543.7, dated Aug. 16, 2021 in 16 pages including English translation.

* cited by examiner

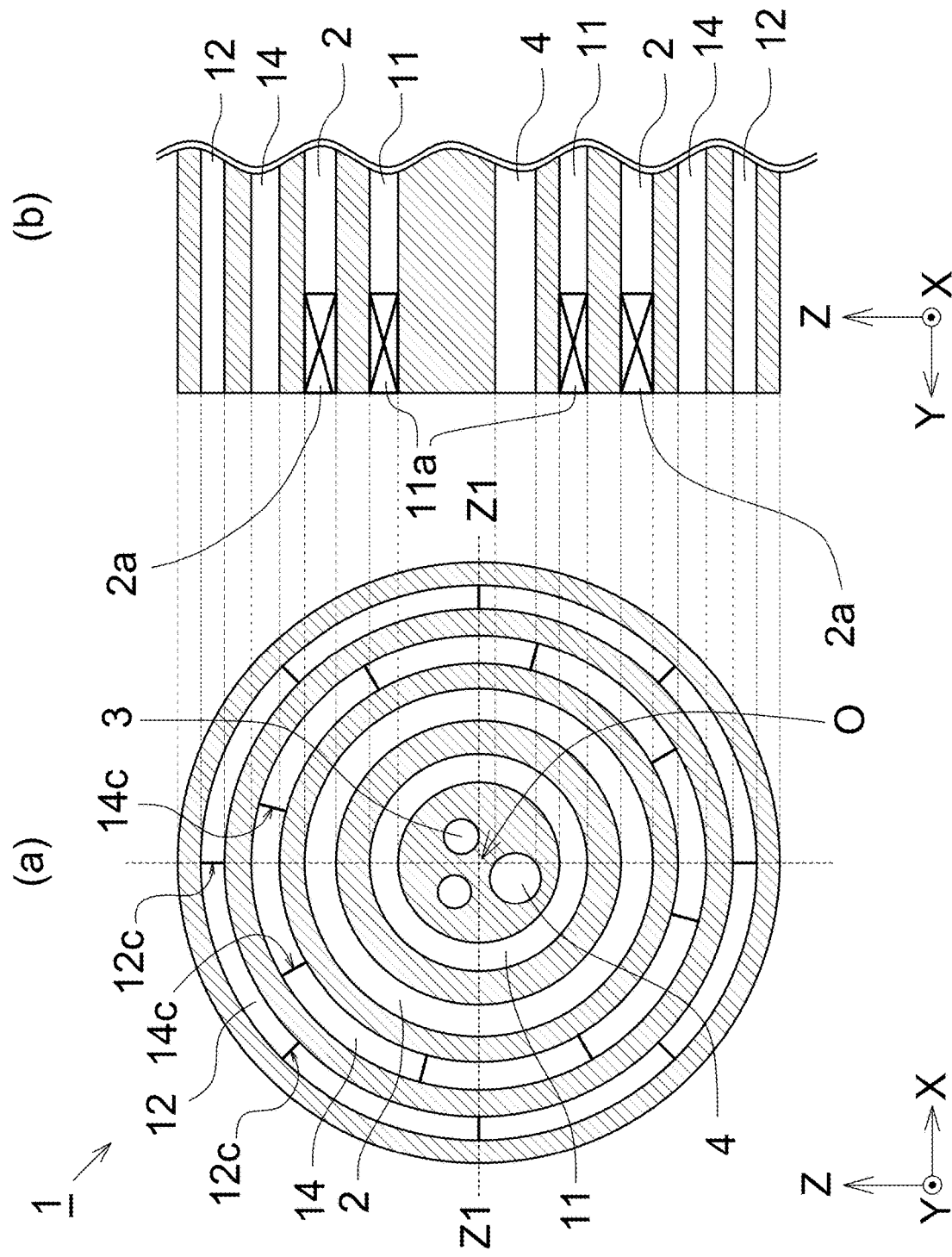

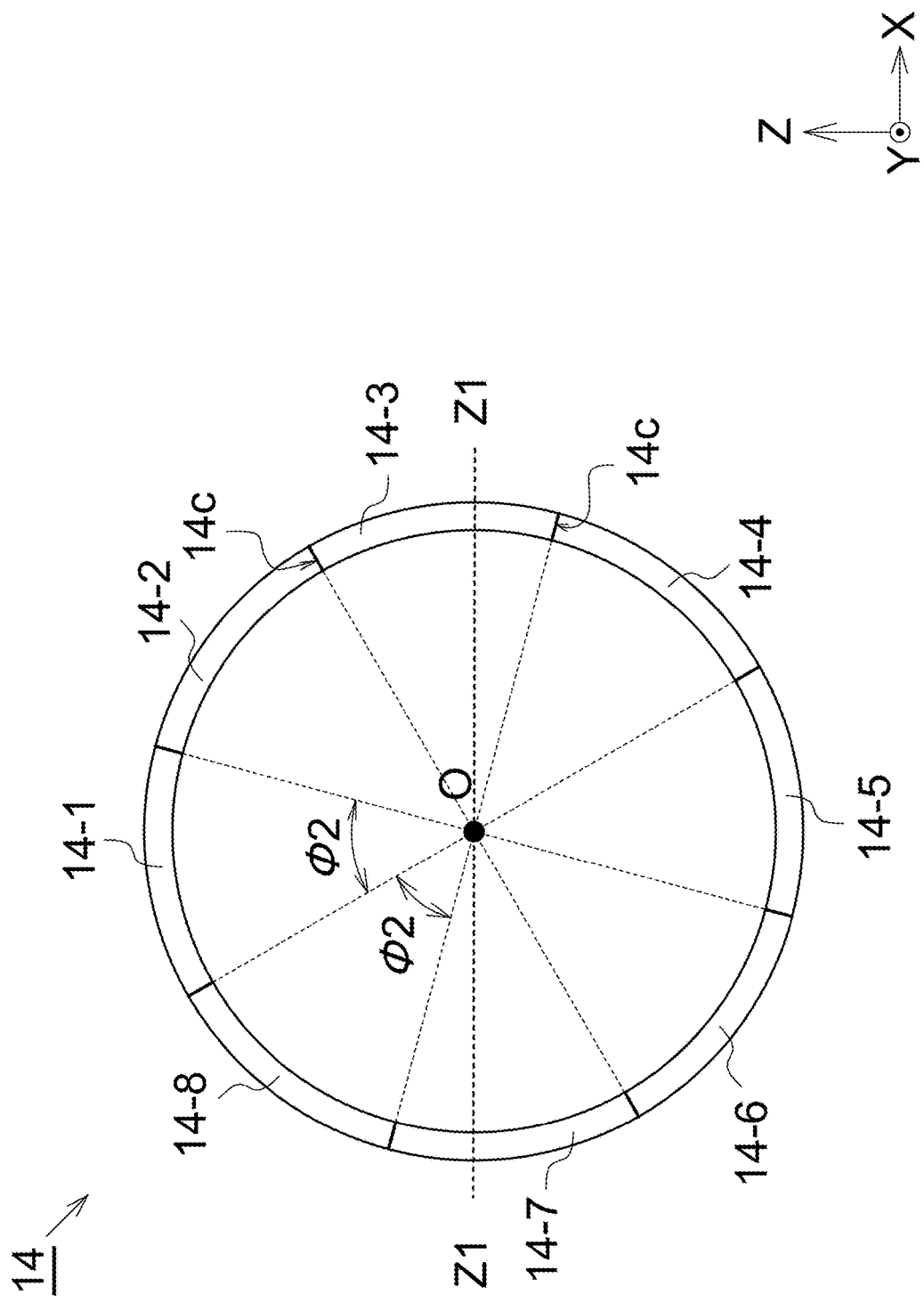

CEMENT KILN BURNER DEVICE AND METHOD FOR OPERATING THE SAME

CROSS-REFERENCE TO RELATED APPLICATIONS

This application is the U.S. National Phase under 35. U.S.C. § 371 of International Application PCT/JP2018/035777, filed Sep. 26, 2018. The disclosure of which including the specification, the drawings, and the claims is hereby incorporated by reference in its entirety.

TECHNICAL FIELD

The present invention relates to a cement kiln burner device, particularly to a cement kiln burner device capable of utilizing combustible solid wastes as supplemental fuels in calcinations for cement clinkers. Further, the present invention relates to a method for operating such a cement kiln burner device.

BACKGROUND ART

Combustible solid wastes, such as waste plastics, wood chips, automobile shredder residues (ASR), have heat quantities enough to use such combustible solid wastes as calcination fuels. Therefore, there has been promotion of effective utilization of combustible solid wastes as alternative fuels substituted for pulverized coals, which are main fuels, in rotary kilns for use in cement clinker calcinations. Hereinafter, such rotary kilns for use in cement clinker calcinations will be referred to as "cement kilns".

Conventionally, in fuel recycling of combustible solid wastes with cement kilns, combustible solid wastes have been used in calcining furnaces installed at kiln tail portions, which exert less influences on cement clinkers. However, such calcining furnaces have been nearly saturated with combustible solid wastes used therein in amount. Therefore, there have been requirements for techniques for using combustible solid wastes in main burners installed at kiln front portions.

However, use of combustible solid wastes as supplemental fuels in main burners of cement kilns may cause phenomena (which will be referred to as "landing combustion") in which combustible solid wastes ejected from main burners are continuously combusted even after having landed on cement clinkers in the cement kilns. If such landing combustion occurs, this induces reducing calcination of cement clinkers around the positions where the combustible solid wastes have landed, which induces whitening of cement clinkers, and abnormal clinkering reactions.

In order to prevent landing combustion of combustible solid wastes, there have been required techniques for maintaining a combustible solid waste at a floating state in a cement kiln for a longer time period and completing combustion of the combustible solid waste maintained at the floating state, or techniques for causing a combustible solid waste to land at farther positions (near the kiln tail) within a cement kiln and completing combustion of the combustible solid waste before clinker raw materials reach a clinkering main reaction area.

For example, the following Patent Document 1 discloses a cement kiln provided with a main fuel burner for ejecting pulverized coal as a main fuel, and an auxiliary burner for injecting a combustible solid waste, as a technique for combusting a major part of a combustible solid waste in a floating state. In the cement kiln, primary air from the main fuel burner is supplied in such a way as to swirl in one direction when viewed in the axis direction from the kiln front side of the cement kiln main body, and the auxiliary burner is placed outside the main fuel burner within the range from the top portion (0 degree) of the main fuel burner to 55 degrees in the opposite direction from the aforementioned one direction about the axis, with respect to a vertical straight line passing through the aforementioned axis.

PRIOR ART DOCUMENT

Patent Document

Patent Document 1: JP-A-2013-237571

SUMMARY OF THE INVENTION

Problems to be Solved by the Invention

However, the method in Patent Document 1 is insufficient in effect of maintaining combustible solid wastes at floating states, which restricts combustible solid wastes adaptable thereto to those with smaller bulk specific gravities, such as waste plastics. Further, this method in Patent Document 1 has the problem of difficulty in completely combusting even waste plastics having sizes with outer diameters more than 15 mm while maintaining them at floating states. Namely, the method in Patent Document 1 imposes a large restriction on combustible solid wastes usable therein, in terms of bulk specific gravity and size.

In view of the aforementioned problems, it is an object of the present invention to provide a cement kiln burner device capable of intensively bringing a combustible solid waste into a floating state within a cement kiln and easily causing ignition of the combustible solid waste in the floating state, and a method for operating the same.

Means for Solving the Problems

The present inventors have conducted earnest studies about a method for injecting a combustible solid waste from a main burner, in such a way as to intensively bring the combustible solid waste into a floating state within a cement kiln and to easily cause ignition of the combustible solid waste in the floating state. As a result, they have found that the aforementioned problems can be solved by spatially dividing a primary air straight flow from a channel positioned in an outermost side in a circumferential direction and controlling the flow rates of the divided air flows independently of each other, in a multiple-channel type burner including two or more flow channels for primary air, in addition to a single flow channel for a fuel flow (air flow containing pulverized coal), as injection ports in a main burner.

Namely, a cement kiln burner device according to the present invention is a cement kiln burner device including a plurality of flow channels partitioned by a plurality of concentric cylindrical members, the cement kiln burner device including:

a powdered-solid-fuel flow channel including means for swirling a powdered-solid-fuel flow;

a first air flow channel (first swirl inner flows) placed inside the powdered-solid-fuel flow channel to be adjacent to the powdered-solid-fuel flow channel, the first air flow channel including means for swirling an air flow;

a second air flow channel (first straight outer flows) placed in an outermost side outside the powdered-solid-fuel flow channel, the second air flow channel including means for straightly forwarding an air flow; and a combustible-solid-waste flow channel placed inside the first air flow channel, in which the second air flow channel is divided in a circumferential direction into four or more opening portions adapted to form ports for injecting air flows and is configured to control flow rates of the air flows ejected from the opening portions, independently for each opening portion.

Further, the powdered-solid-fuel flow channel, the first air flow channel, the second air flow channel, and the combustible-solid-waste flow channel are each extended up to the tip end surface of the cement burner device.

Namely, the cement kiln burner device having the aforementioned structure includes at least one air flow channel (first straight outer flows) in an outer side and one air flow channel (first swirl inner flows) in an inner side, such that the powdered-solid-fuel flow channel is sandwiched therebetween. It is possible to easily perform adjustments for providing optimum flame suitable for the types of the powdered solid fuel and the combustible solid waste which are used therein, and the like, by controlling the amounts of air flowing through these at least two air flow channels, independently of each other.

As described above, the second air flow channel for forming first straight outer flows is placed in the outermost side outside the powdered-solid-fuel flow channel, and is divided in the circumferential direction into the four or more opening portions adapted to form ports for injecting air flows. Further, the second air flow channel is configured such that air flows ejected from the respective opening portions can be controlled in flow rate, independently of each other.

Therefore, for example, by substantially nulling the flow rates of air flows ejected from adjacent opening portions, it is possible to cause the injection ports in the second air flow channel to intermittently inject first straight outer flows therefrom, thereby substantially creating a bundle of several straight outer flows. This increases the degree and range of turbulence of air flows ejected from the burner, which enables rapidly introducing, into burner flame, a larger amount of secondary air, which is high-temperature air supplied into the cement kiln from a clinker cooler. This allows to combust the combustible solid waste in a floating state.

If combustion by the burner is performed for a long time period, this may cause changes of the burner combustion state with time, such as changes of the burner flame shape. Further, depending on the types of the powdered solid fuel and the combustible solid waste which are used therein, there may be a need for adjusting combustion conditions while continuing the running state. With the aforementioned structure, it is possible to control the flow rates of air flows ejected from the respective opening portions constituting the air-flow injection ports in the second air flow channel, thereby controlling the flow rates of air flows independently for each opening portion. This enables adjusting air-flow supply conditions depending on the burner flame shape and the fuel combustion state, thereby easily performing adjustments for providing optimum flame.

Preferably, the cement kiln burner device further includes means for straightly forwarding a combustible-solid-waste flow ejected from the combustible-solid-waste flow channel.

With this structure, it is possible to sufficiently mix the combustible-solid-waste flow with the primary air ejected from the respective flow channels and with the secondary air. This enables rapidly attaining a high-temperature environment, while supplying a sufficient amount of oxygen to peripheries of the combustible solid waste being in a floating state, thereby promptly completing the combustion of the combustible solid waste.

Further, the cement kiln burner device may further include a third air flow channel (first swirl outer flows) that is placed outside the powdered-solid-fuel flow channel and inside the second air flow channel, and that includes means for swirling an air flow.

Further, the cement kiln burner device may further include a fourth air flow channel (second straight outer flows) that is placed outside the powdered-solid-fuel flow channel and inside the second air flow channel, in addition to the third air flow channel or instead of the third air flow channel, and that includes means for straightly forwarding an air flow.

When the cement kiln burner device includes the fourth air flow channel in addition to the third air flow channel, the fourth air flow channel may be placed outside the third air flow channel and inside the second air flow channel.

In this case, the fourth air flow channel constituting the second straight outer flows may be divided in the circumferential direction into four or more opening portions adapted to form ports for injecting air flows, and may be configured to control flow rates of the air flows ejected from the opening portions, independently for each opening portion, similarly to the second air flow channel constituting the first straight outer flows.

With the aforementioned structure, it is possible to adjust air-flow supply conditions with higher flexibility.

Further, in the cement kiln burner device, when the second air flow channel is taken along a plane orthogonal to an axis center, a center angle formed by connecting opposite ends, in the circumferential direction, of each opening portion included in the second air flow channel and the axis center is identical for each opening portion.

Further, according to the present invention, there is provided a method for operating the cement kiln burner device, the method including ejecting an air flow from each opening portion included in the second air flow channel at a flow velocity of 0 m/s to 400 m/s (except when all air flows ejected from all the opening portions have a flow velocity of 0 m/s).

In the method for operating the cement kiln burner device, a powdered-solid-fuel flow from the powdered-solid-fuel flow channel may have a swirl angle of 0 degree to 15 degrees at a burner tip. Further, an air flow from the first air flow channel (first swirl inner flows) may have a swirl angle of 30 degrees to 50 degrees at the burner tip.

Further, in the method for operating the cement kiln burner device, a flow velocity at the burner tip in the powdered-solid-fuel flow channel may be 30 m/s to 80 m/s, a flow velocity at the burner tip in the first air flow channel may be 5 m/s to 240 m/s, and a flow velocity at the burner tip in the combustible-solid-waste flow channel may be 30 m/s to 80 m/s.

Further, in the method for operating the cement kiln burner device, a combustible solid waste ejected from the combustible-solid-waste flow channel may have a particle size of 30 mm or less.

Effect of the Invention

With the cement kiln burner device according to the present invention and with the method for operating the cement kiln burner device according to the present invention, it is possible to effectively utilize combustible solid wastes such as waste plastic pieces as supplemental fuels without causing landing combustion thereof.

BRIEF DESCRIPTION OF THE DRAWINGS

FIG. 9 is a view schematically illustrating a cement kiln burner device according to the present invention, in still another embodiment, at its tip-end portion.

FIG. 10 is a view schematically illustrating a fourth air flow channel extracted from FIG. 9.

MODE FOR CARRYING OUT THE INVENTION

Figure 1:
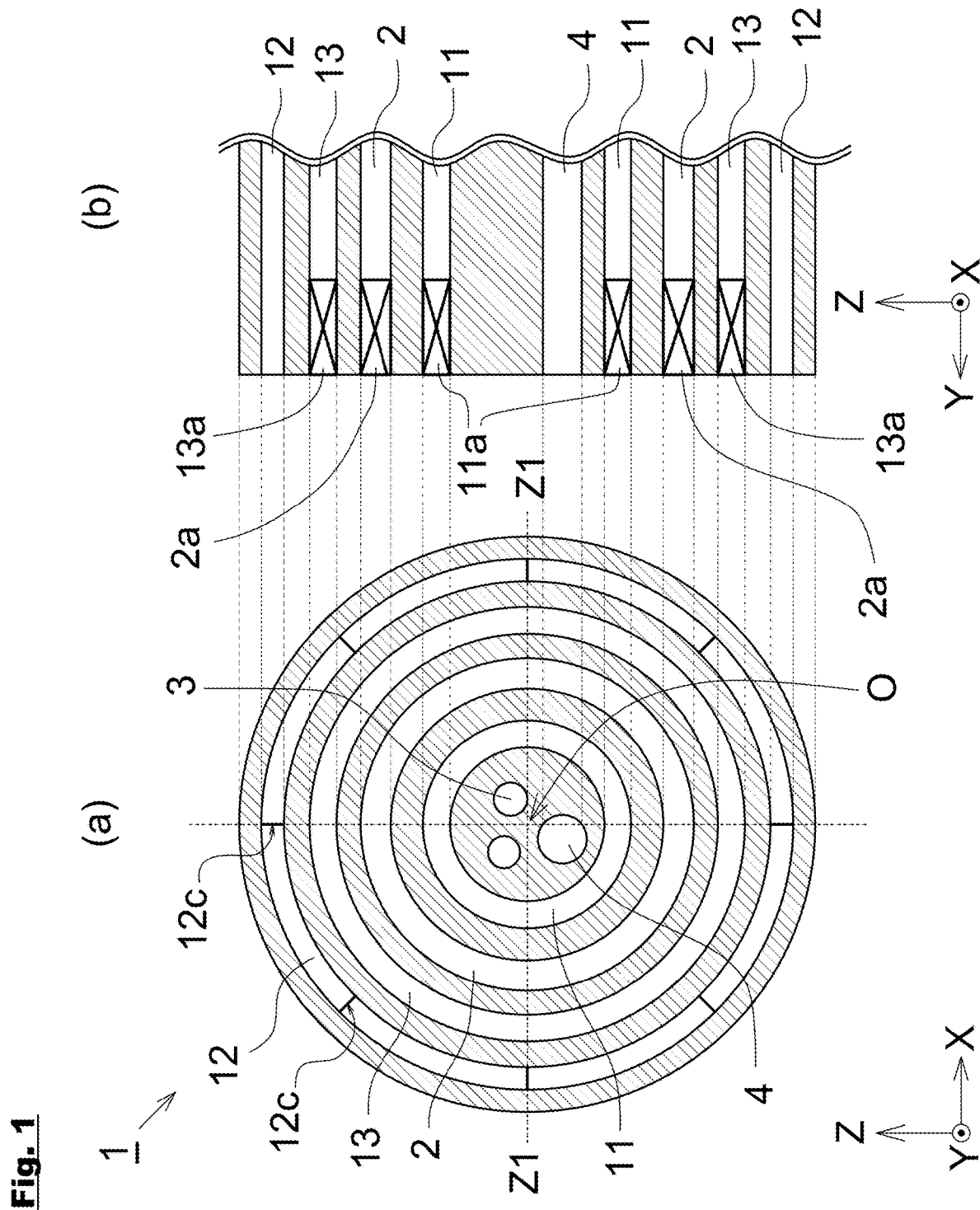
FIG. 1 is a view schematically illustrating a cement kiln burner device according to the present invention, in an embodiment, at its tip-end portion.

Hereinafter, there will be described embodiments of a cement kiln burner device and a method for operating the same, according to the present invention, with reference to the drawings. Incidentally, the drawings which will be described later are schematically illustrated, and dimension ratios in the drawings are not coincident with the actual dimension ratios.

FIG. 1 is a view schematically illustrating a cement kiln burner device according to the present invention, in an embodiment, at its tip-end portion. In FIG. 1, (a) is a lateral cross-sectional view of the cement kiln burner device, and (b) is a longitudinal cross-sectional view of the same. Further, the lateral cross-sectional view refers to a cross-sectional view of the cement kiln burner device taken along a plane orthogonal to the axial direction of the same device. The longitudinal cross-sectional view refers to a cross-sectional view of the cement kiln burner device taken along a plane parallel to the axial direction of the same device.

Further, in FIG. 1, there is defined a coordinate system, by defining the axial direction of the cement kiln burner device (namely, the direction of air flows) as a Y direction, by defining the vertical direction as a Z direction, and by defining the direction orthogonal to a YZ plane as an X direction. Hereinafter, descriptions will be given by making reference to this XYZ coordinate system. By using this XYZ coordinate system, FIG. 1(a) corresponds to a cross-sectional view of the cement kiln burner device, taken along an XZ plane, and FIG. 1(b) corresponds to a cross-sectional view of the cement kiln burner device, taken along a YZ plane. More specifically, FIG. 1(b) corresponds to a cross-sectional view of the cement kiln burner device, taken along a YZ plane, at a position near the burner tip.

As illustrated in FIG. 1, the cement kiln burner device 1 includes plural flow channels in a concentric manner. More specifically, the cement kiln burner device 1 includes a total of four flow channels, which are a powdered-solid-fuel flow channel 2, a first air flow channel 11 placed inside the powdered-solid-fuel flow channel 2 adjacent thereto, a second air flow channel 12 placed in an outermost side outside the powdered-solid-fuel flow channel 2, and a third air flow channel 13 placed outside the powdered-solid-fuel flow channel 2 and inside the second air flow channel 12. Namely, the cement kiln burner device 1 illustrated in FIG. 1 is a so-called 4-channel type burner device. Further, there are placed an oil flow channel 3, a combustible-solid-waste flow channel 4 and the like, inside the first air flow channel 11.

In the powdered-solid-fuel flow channel 2, the first air flow channel 11 and the third air flow channel 13, out of the powdered-solid-fuel flow channel 2 and the first to third air flow channel 11 to 13, swirl vanes (2a, 11a, 13a) as swirl means are secured to the burner tip-end portions in the respective flow channels (see FIG. 1(b)), respectively. Namely, air flows ejected from the first air flow channel 11 form swirl air flows (which will be properly referred to as "first swirl inner flows", hereinafter) positioned inside powdered-solid-fuel flows ejected from the powdered-solid-fuel flow channel 2. Air flows ejected from the third air flow channel 13 form swirl air flows (which will be properly referred to as "first swirl outer flows", hereinafter) positioned outside powdered-solid-fuel flows ejected from the powdered-solid-fuel flow channel 2. Further, the respective swirl vanes (2a, 11a, 13a) are adjustable in swirl angle, at the time point before the start of operation of the cement kiln burner device 1.

On the other hand, no swirl means is provided in the second air flow channel 12 positioned in the outermost side. Namely, air flows ejected from the second air flow channel 12 form straight air flows (which will be properly referred to as "first straight outer flows", hereinafter) positioned outside powdered-solid-fuel flows ejected from the powdered-solid-fuel flow channel 2. This will be described with reference to FIG. 2, which schematically illustrates only the second air flow channel 12 extracted from FIG. 1.

Figure 2:
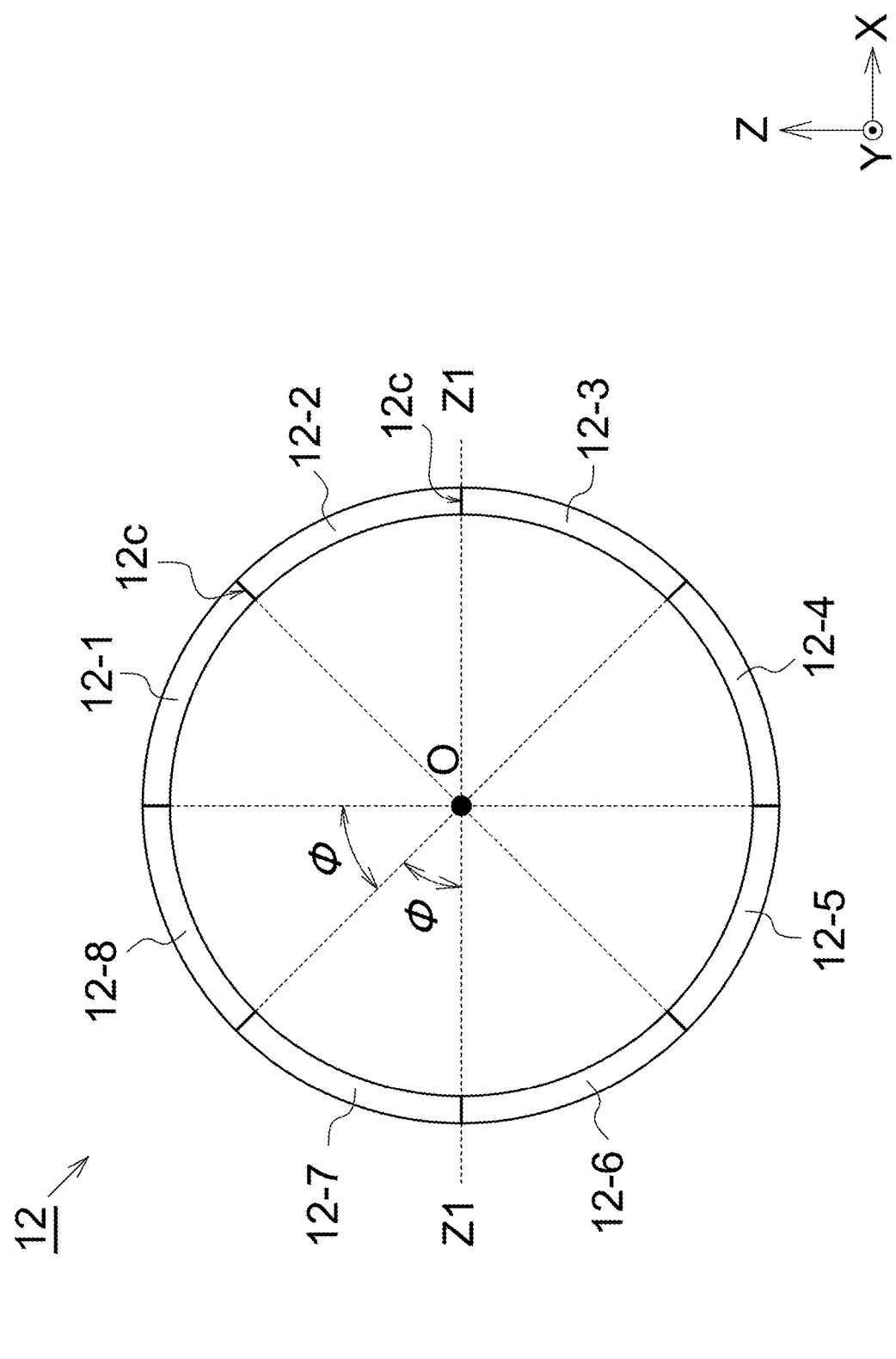
FIG. 2 is a view schematically illustrating a second air flow channel extracted from FIG. 1.

In the present embodiment, the second air flow channel 12 is divided into plural flow channels in the circumferential direction. More specifically, as illustrated in FIG. 2, the second air flow channel 12 is partitioned in the circumferential direction by partition portions 12c, into plural opening portions (12-1, 12-2, . . . ) which form ports for injecting air flows. In the present embodiment, the number of the divisions of the second air flow channel 12 is 8, and the opening portions (12-1, 12-2, . . . , 12-8) which form the respective divisional flow channels have the same center angle Φ. In this case, the center angle Φ corresponds to an angle formed by connecting the opposite ends of each opening portion (12-1, 12-2, . . . , 12-8) in the circumferential direction to the axis center when the second air flow channel 12 is taken along a plane (an XY plane) orthogonal to the axis center O extending in the Y direction, as illustrated in FIG. 2.

In the present embodiment, the second air flow channel 12 is configured such that air flows ejected from these opening portions (12-1, 12-2, . . . , 12-8) can be controlled in flow rate, independently of each other, for each of the opening portions (12-1, 12-2, . . . , 12-8) which are the divisions of the second air flow channel 12. This will be described with reference to FIG. 3.

Figure 3:
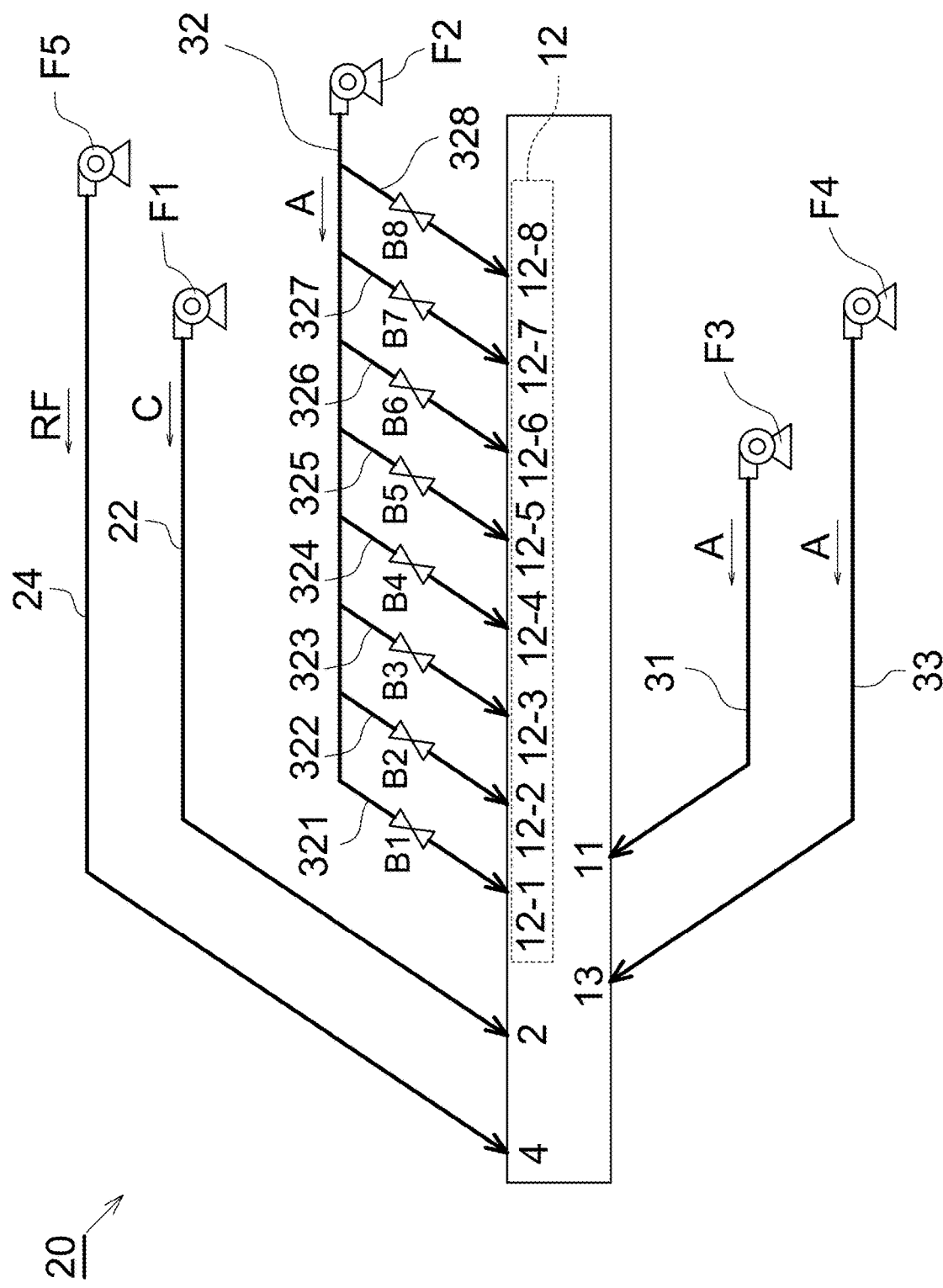
FIG. 3 is a view schematically illustrating an example of the structure of a cement kiln burner system including the cement kiln burner device illustrated in FIG. 1.

FIG. 3 is a view schematically illustrating an example of the structure of a cement kiln burner system including the cement kiln burner device 1 illustrated in FIG. 1. The cement kiln burner system 20 illustrated in FIG. 3 is structured in such a way as to place importance on facilitating the control, and this cement kiln burner system 20 includes five blowing fans F1 to F5.

A pulverized coal C (corresponding to "a powdered solid fuel") supplied to a pulverized-coal transfer pipe 22 is supplied to the powdered-solid-fuel flow channel 2 in the cement kiln burner device 1, through air flows formed by the blowing fan F1. Air supplied from the blowing fan F3 is supplied, as combustion air A, to the first air flow channel 11 in the cement kiln burner device 1, through an air pipe 31. Air supplied from the blowing fan F4 is supplied, as combustion air A, to the third air flow channel 13 in the cement kiln burner device 1, through an air pipe 33. A combustible solid waste RF supplied to a combustible-solid-waste transfer pipe 24 is supplied to the combustible-solid-waste flow channel 4 in the cement kiln burner device 1, through air flows formed by the blowing fan F5.

Further, air supplied from the blowing fan F2 is supplied, as combustion air A, to the second air flow channel 12 in the cement kiln burner device 1, through an air pipe 32. More specifically, the air pipe 32 is branched by eight branch pipes (321, 322, . . . , 328), and the respective branch pipes (321 to 328) are communicated with the plural opening portions (12-1, 12-2, . . . , 12-8), which are the divisions of the second air flow channel 12 in the cement kiln burner device 1. The branch pipes (321 to 328) are provided with respective gas valves (B1 to B8). By adjusting the degrees of opening of these gas valves (B1 to B8), it is possible to control the flow rates of air flows passing through the respective branch pipes (321 to 328), independently of each other.

The cement kiln burner system 20 illustrated in FIG. 3 is capable of controlling the amount of air flowing through each of the flow channels (2, 4, 11, 12, 13), independently, through the blowing fans (F1 to F5). Further, regarding the second air flow channel 12, the cement kiln burner system 20 is capable of controlling the amount of air ejected from each of the divisional opening portions (12-1, 12-2, . . . , 12-8), independently, through the gas valves (B1 to B8). This enables easily performing adjustments for providing optimum flame suitable for the type of the powdered solid fuel such as pulverized coal, petroleum coke or other solid fuels, the type of the combustible solid waste such as waste plastic, meat-and-bone meals or biomasses, and various cement-kiln operating environments.

Incidentally, in the present specification, the term "biomass" refers to organic resources (except fossil fuels) derived from living things, which are usable as fuels and the like. For example, the term "biomass" corresponds to shredded waste tatamis, shredded waste construction woods, wood chips, saw dusts and the like.

In addition, heavy oil or the like can be also supplied through the oil flow channel 3 for being used in ignition of the cement kiln burner device 1, and further, a solid fuel other than pulverized coal or a liquid fuel such as heavy oil can be supplied for being used in mixed combustion together with pulverized coal during normal operation (not shown).

Namely, the cement kiln burner device 1 (and the cement kiln burner system 20) according to the present invention, an embodiment of which is illustrated in FIGS. 1 to 3, is a 4-channel type burner device including the three air flow channels (11, 12, 13), in addition to the powdered-solid-fuel flow channel 2. Further, during use of the cement kiln burner device 1, the amounts of air flowing through the respective flow channels (2, 4, 11, 12, 13) can be controlled, by controlling operation of the five blowing fans (F1 to F5) and the eight gas valves (B1 to B8). Particularly, the amount of air flowing through the second flow channel 12 can be controlled, for each of the plural opening portions (12-1, 12-2, . . . , 12-8), which are the divisions of this flow channel. Further, in addition thereto, before use of the cement kiln burner device 1, the swirl vanes (2a, 11a, 13a) provided in the powdered-solid-fuel flow channel 2, the first air flow channel 11 and the third air flow channel 13 can be adjusted in swirl angle. With this structure, it is possible to perform control in various manners as required.

Figure 4:
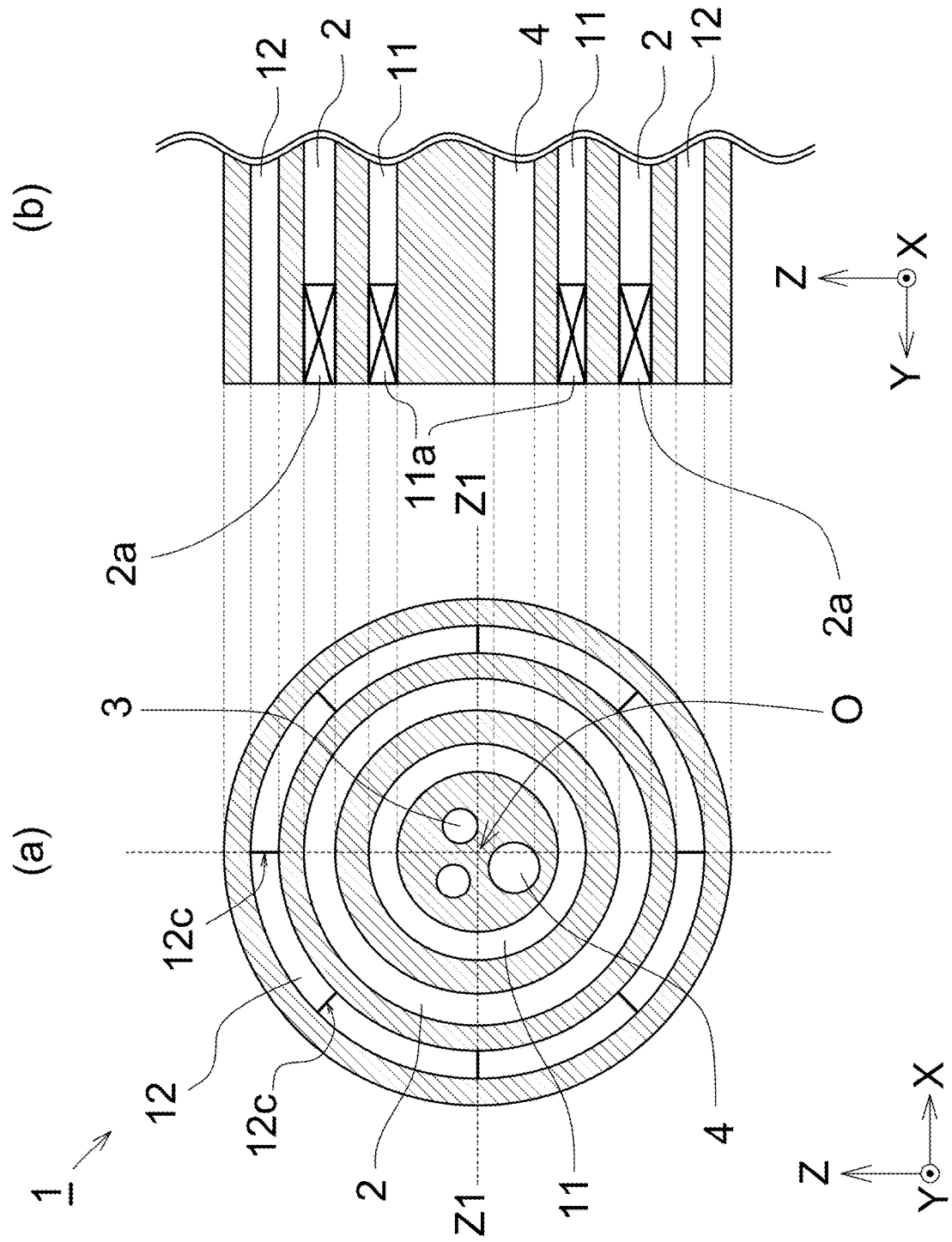
FIG. 4 is a view schematically illustrating a cement kiln burner device according to the present invention, in another embodiment, at its tip-end portion.

FIG. 4 is a view schematically illustrating a cement kiln burner device according to the present invention, in another embodiment, at its tip-end portion. In FIG. 4, similarly to in FIG. 1, (a) is a lateral cross-sectional view of the cement kiln burner device, and (b) is a longitudinal cross-sectional view of the same.

The cement kiln burner device 1 illustrated in FIG. 4 is different from the structure of FIG. 1, in that it includes no third air flow channel 13 for forming first swirl outer flows, but other portions are the same. Namely, the cement kiln burner device 1 illustrated in FIG. 4 includes a total of three flow channels, which are a powdered-solid-fuel flow channel 2, a first air flow channel 11 placed inside the powdered-solid-fuel flow channel 2 adjacent thereto, and a second air flow channel 12 placed at an outermost position outside the powdered-solid-fuel flow channel 2. Namely, the cement kiln burner device 1 illustrated in FIG. 4 is a so-called 3-channel type burner device. Further, the structure of the second air flow channel 12 is the same as that of FIG. 2 and is not described herein.

In the case of the 3-channel type burner device illustrated in FIG. 4, first swirl outer flows are not formed, in comparison with the 4-channel type burner device illustrated in FIG. 1. However, similarly to the 4-channel type burner device illustrated in FIG. 1, the second air flow channel 12 for forming straight outer flows positioned in the outermost side, which is placed outside the powdered-solid-fuel flow channel 2, is divided in the circumferential direction by plural opening portions (12-1, 12-2, . . . , 12-8), and respective divisional air flows can be controlled independently of each other. This enables adjustments for providing optimum flame suitable for cement-kiln operating environments.

Figure 5:
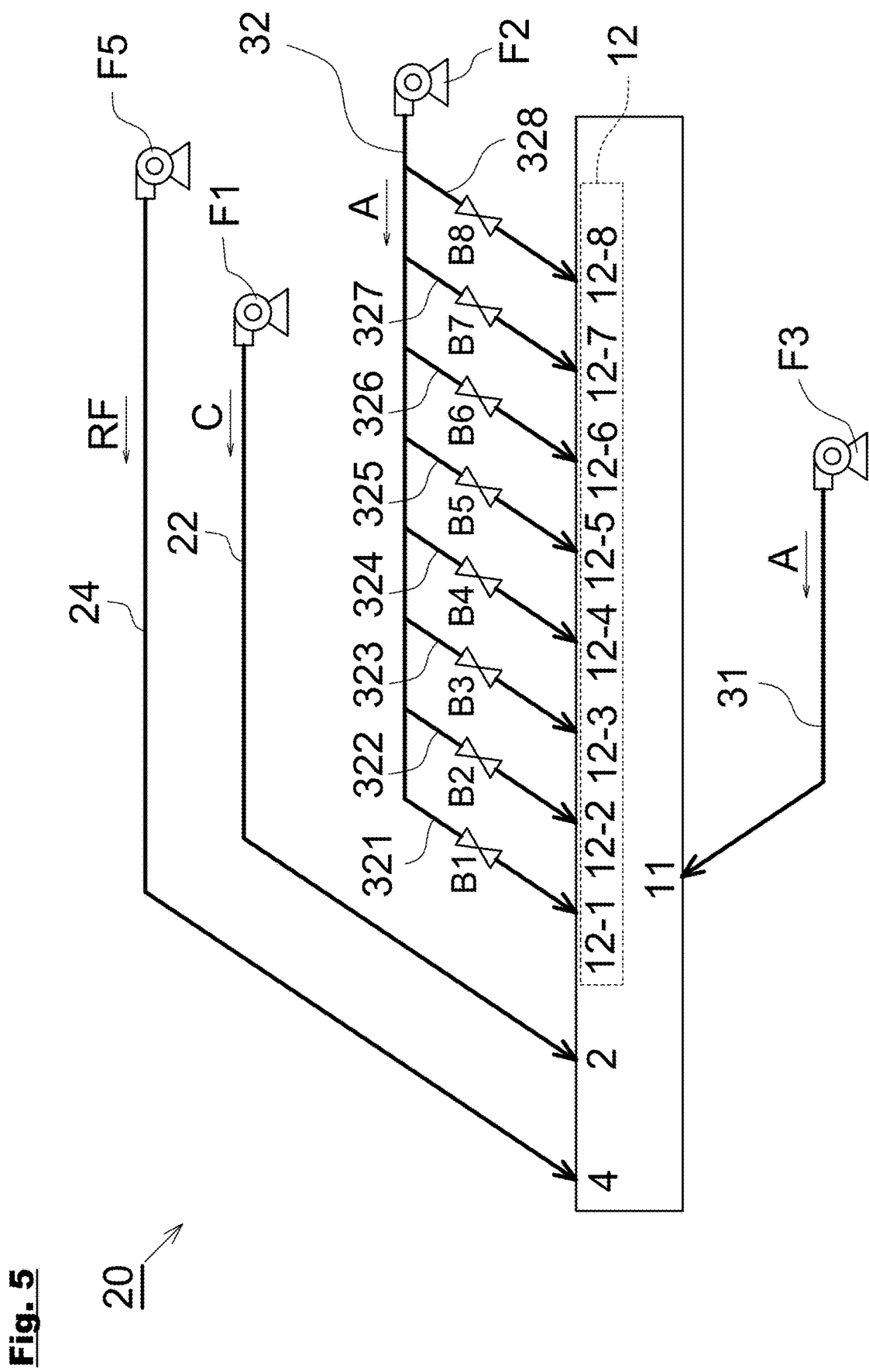
FIG. 5 is a view schematically illustrating an example of the structure of a cement kiln burner system including the cement kiln burner device illustrated in FIG. 4.

As described above, the 3-channel type burner device 1 illustrated in FIG. 4 includes no third air flow channel 13, unlike the 4-channel type illustrated in FIG. 1. Therefore, as illustrated in FIG. 5, a cement kiln burner system 20 including this cement kiln burner device 1 can be structured not to include the blowing fan F4, in comparison with FIG. 3.

The present inventors found basic limitation regions for optimizing control factors, by conducting analyses about flame shapes, temperature distributions within cement kilns, oxygen concentration distributions within cement kilns, degrees of turbulences of air flows within cement kilns, and the like, through combustion simulations (software: FLUENT manufactured by ANSYS JAPAN K.K.) for the cement kiln burner device 1.

The following Tables 1 and 2 represent examples of basic limitation regions found under the following burner combustion conditions. Incidentally, Table 1 corresponds to the 4-channel type cement kiln burner device 1 illustrated in FIG. 1, and Table 2 corresponds to the 3-channel type cement kiln burner device 1 illustrated in FIG. 4.

<Burner Combustion Conditions>

The amount of pulverized coal C combusted: 15 t/hour
The amount of waste plastic (non-rigid plastic) as combustible solid waste RF which was processed: 3 t/hour
The size of waste plastic as combustible solid waste RF: a circular sheet shape with a diameter of 30 mm which was formed by punching a sheet with a thickness of 0.5 mm
The amount and the temperature of secondary air: 150000 Nm3/hour, 800 degrees C.
The diameter of the burner tip in the cement kiln burner device 1: 700 mm

TABLE 1

| | 4 channel type burner | | | | |
|---|---|---|---|---|---|
| | Flow channel number (FIG. 1) | Burner-tip flow velocity (m/s) | Primary air ratio (volume %) | Opening-portion rate (area %) | Swirl angle (degree) |
| Powdered solid fuel flow | 2 | 30~80 | 2~6 | 100 | 0~15 |
| First swirl inner flow | 11 | 5~240 | 1~5 | 100 | 30~50 |
| First straight outer flow | 12 | 0~400 | 2~11 | 20~100 | 0 |
| First swirl outer flow | 13 | 60~240 | 1~5 | 100 | 1~50 |
| Combustible solid waste flow | 4 | 30~80 | 2~6 | 100 | 0 |

TABLE 2

| | 3 channel type burner | | | | |
|---|---|---|---|---|---|
| | Flow channel number (FIG. 4) | Burner-tip flow velocity (m/s) | Primary air ratio (volume %) | Opening-portion rate (area %) | Swirl angle (degree) |
| Powdered solid fuel flow | 2 | 30~80 | 2~6 | 100 | 0~15 |
| First swirl inner flow | 11 | 5~240 | 1~5 | 100 | 30~50 |
| First straight outer flow | 12 | 0~400 | 2~11 | 20~100 | 0 |
| Combustible solid waste flow | 4 | 30~80 | 2~6 | 100 | 0 |

Table 1 enumerates, as basic limitation regions, the flow velocity (m/s) at the burner tip, the primary air ratio (volume %), the opening-portion rate (area %), and the swirl angles of the swirl vanes (2a, 11a, 13a), in the aforementioned powdered-solid-fuel flow channel 2, the first air flow channel 11 (for forming first swirl inner flows), the second air flow channel 12 (for forming first straight outer flows), the third air flow channel 13 (for forming first swirl inner flows), and the combustible-solid-waste flow channel 4. Incidentally, in the present specification, the term "the primary-air ratio" refers to the ratio of the amount of primary air to the theoretical amount of combustion air (A0 ratio).

Similarly, Table 2 enumerates, as basic limitation regions, the flow velocity (m/s) at the burner tip, the primary air ratio (volume %), the opening-portion rate (area %), and the swirl angles of the swirl vanes (2a, 11a), in the aforementioned powdered-solid-fuel flow channel 2, the first air flow channel 11 (for forming first swirl outer flows), the second air flow channel 12 (for forming first straight outer flows), and the combustible-solid-waste flow channel 4.

Among the aforementioned respective items, the flow velocity (m/s) at the burner tip in the second air flow channel 12 for forming first straight outer flows, which is positioned in the outermost side, is important in particular. More specifically, the flow velocities (m/s), at the burner tip, of air flows ejected from the respective opening portions (12-1, 12-2, . . . , 12-8), which are the divisions of the second air flow channel 12, are particularly important.

This is because of the following reason. That is, as described above, in order to combust the combustible solid waste maintained at a floating state, it is necessary to sufficiently form an area within which air flows form turbulent flows within flame. By making the flow rates of first straight outer flows different from each other in the circumferential direction, it is possible to form turbulent flows with higher intensity in flame, to such an extent as to impose no influence on the calcination for cement clinker. However, if the degree of such turbulent flows is excessive, this may destabilize a temperature distribution within the cement kiln and, furthermore, may bring a portion of flame into direct contact with the cement-clinker raw materials, which results in degradation of the quality of the produced cement clinker.

In view of such circumstances, it is preferable that the respective air flows ejected from the respective opening portions (12-1, 12-2, . . . , 12-8), which are the divisions of the first air flow channel 12 positioned in the outermost side, have burner-tip flow velocities of 0 m/s to 400 m/s. Namely, no air flow may be ejected from certain opening portions, in some cases. However, this excepts cases where respective air flows ejected from all the opening portions (12-1, 12-2, . . . , 12-8) have a burner-tip flow velocity of 0 m/s.

Further, the total amount of primary air ejected from the respective opening portions (12-1, 12-2, . . . , 12-8), which are the divisions of the second air flow channel 12 positioned in the outermost side, namely the amount of primary air ($m^3N/min$) supplied by the blowing fan F2, is a largest amount of air, out of those in the powdered-solid-fuel flows, the combustible-solid-waste flows and all the other primary air flows. If the amount of primary air supplied by the blowing fan F2 is smaller than the amounts of primary air in the other air flows, this may cause insufficient formation of turbulent flows in flame.

Further, if air flows ejected from the respective opening portions (12-1, 12-2, . . . , 12-8), which are the divisions of the first air flow channel 12 positioned in the outermost side, have burner-tip flow velocities exceeding 400 m/s, this may induce excessive formation of turbulent flows in flame, thereby degrading the quality of the produced cement clinker.

Further, it is preferable that the opening-portion rate in the second air flow channel 12 positioned in the outermost side is 20 area % to 100 area %. In this case, the term "opening-portion rate" refers to the ratio of the total area of the opening portions (12-1, 12-2, . . . , 12-8) with respect to the entire area, when the second air flow channel 12 is taken along a plane (an XY plane) orthogonal to the axis center O extending in the Y direction, as illustrated in FIG. 2. However, when the opening portions (12-1, 12-2, . . . , 12-8) includes an opening portion 12-X where an air flow has an air volume of zero, the opening portion 12-X is caused to pass no air flow therethrough, and therefore actually corresponds to a closed portion. Therefore, the value of the aforementioned ratio to be employed is calculated in such a way as not to include the area of the opening portion 12-X in the total area of the opening portions.

When the opening-portion rate is less than 100 area %, in a preferable aspect of primary air flows from the second air flow channel 12, air flows are ejected from only the vertically-lower side (−Z-direction side) with respect to a plane (a plane Z1-Z1 in FIGS. 1 and 4) which includes the axis center O and is parallel to the axial direction of the concentric cylindrical members. More specifically, in FIG. 2, in this aspect, primary air is ejected from the opening portions (12-3, 12-4, 12-5, 12-6), while no primary air is ejected from the opening portions (12-1, 12-2, 12-7, 12-8).

Further, in the case of the cement kiln burner device 1 including first swirl outer flows (the third air flow channel 13), such as the 4-channel type burner illustrated in FIG. 1, straight outer flows from the second air flow channel 12 are influenced by the swirling of swirl outer flows from the third air flow channel 13 which is placed inside the second air flow channel 12 adjacent thereto, so that the straight outer flows from the second air flow channel 12 are swirled in the same direction as the direction of the swirling of the swirl outer flows from the third air flow channel 13. A preferable aspect in view of this circumstance is as follows. That is, for example, when swirl outer flows from the third air flow channel 13 are ejected in the direction of right-hand screw rotations, it is possible to position air flows (straight outer flows) from the second air flow channel 12 in a flame lower portion in flame within the cement kiln, by jetting out primary air flows from the upstream side (−X and +Z area in FIG. 1(a) and FIG. 2) in the swirling. As a concrete aspect, in FIG. 2, primary air can be ejected from the opening portions (12-4, 12-5, 12-6, 12-7), while no primary air can be ejected from the opening portions (12-1, 12-2, 12-3, 12-8).

By placing injection ports (opening portions) for ejecting primary air in the vertically-lower side with respect to the axis center O, it is possible to form turbulent flows having ascending effects in burner flame, which enables maintaining even a larger combustible solid waste at a floating state for a longer time period.

Further, when the opening-portion rate is less than 100 area %, as a preferable aspect of primary air flows from the second air flow channel 12, it is possible to employ a method for injecting primary air in a spatially-intermittent manner, by placing injection ports which eject primary air and injection ports which eject no primary air, alternately adjacent to each other. By intermittently placing the injection ports which eject flows and the injection ports which eject no flow, as described above, it is possible to supply air flows from the second air flow channel 12, as a bundle of several straight outer flows. This results in formation of portions with higher and lower air densities within flame, thereby causing turbulent flows in such a way as to eliminate these density differences. As a concrete aspect, in FIG. 2, primary air can be ejected from the opening portions (12-1, 12-3, 12-5, 12-7), while no primary air can be ejected from the opening portions (12-2, 12-4, 12-6, 12-8).

Further, in the aforementioned description, there have been described cases of providing opening portions caused to eject primary air (which will be referred to as "first opening portions" for convenience), and opening portions caused to eject no primary air (which will be referred to as "second opening portions" for convenience). However, it is also possible to realize the same function by providing a larger difference in flow rate therebetween. Namely, the second opening portions can be either adapted to eject no primary air at all or adapted to eject primary air at a flow rate which is much lower than that of the first opening portions.

A next most important basic limitation region is the swirl angles (degrees) in the aforementioned powdered-solid-fuel flow channel 2 and the first air flow channel 11 (for forming first swirl inner flows). This is because of the following reason. That is, swirl flows generated from the swirl vanes (2a, 11a) can stabilize ignition in the burner device and, furthermore, can create internal circulations of air flows in burner flame, which provides flame stabilizing functions. Further, the swirl angles of the swirl vanes (2a, 11a) are fixed during operation of the burner device, in general, and cannot be adjusted for optimization during operation.

Further, in the 4-channel type burner device, the swirl angle (degrees) in the third air flow channel 13 (for forming first swirl outer flows) is also an important factor, in addition to the aforementioned swirl angles, for the same reason.

Figure 6:
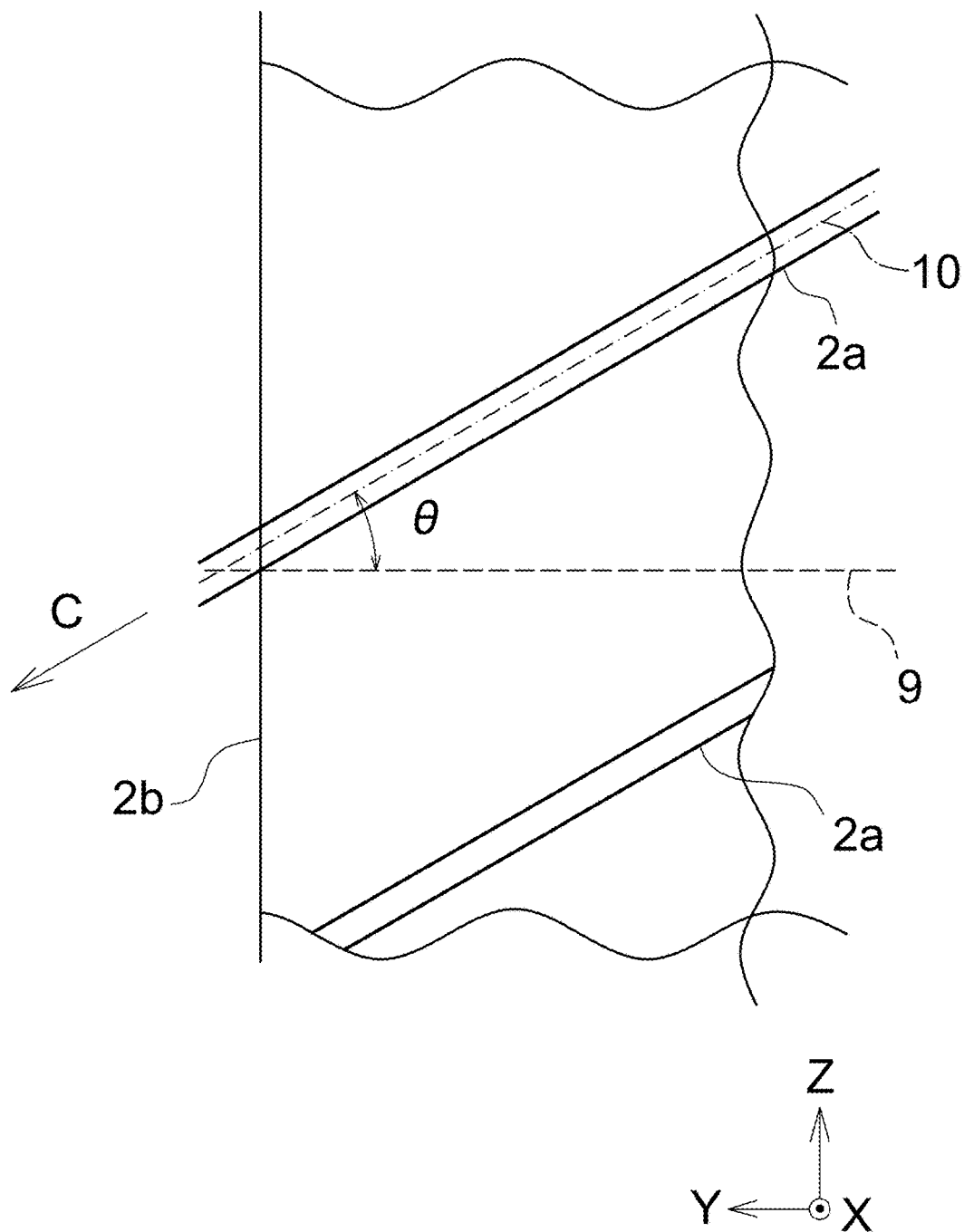
FIG. 6 is a schematic view for explaining the swirl angles of swirl vanes in the cement kiln burner device.

When the cylindrical member to which the swirl vane illustrated in FIG. 1 is secured is developed in a plane as illustrated in FIG. 6, for example, the swirl angle of this swirl vane is the angle θ formed between the axis 9 of the cement kiln burner device 1 and the center line 10 of the swirl vane. The swirl angle of this swirl vane corresponds to the swirl angle of powdered-solid-fuel flows or primary air flows at the burner tip. In FIG. 6, as an example, there is illustrated the swirl vane 2a in the powdered-solid-fuel flow channel 2, wherein the direction of ejection of the pulverized coal C (the powdered solid fuel) at the tip end position 2b in the powdered-solid-fuel flow channel 2 is rotated by the angle θ with respect to the direction of the axis 9 of the cylindrical member (the Y direction in the figure). The swirl angles of the other swirl vanes (11a, 13a) can be also defined similarly.

The swirl angle of powdered-solid-fuel flows caused by the swirl vane 2a in the aforementioned powdered-solid-fuel flow channel 2 is preferably set to be 0 degree to 15 degrees. If this swirl angle is larger than 15 degrees, this induces excessive mixture of the powdered solid fuel (pulverized coal C) ejected from the powdered-solid-fuel flow channel 2, with the aforementioned secondary air introduced in the powdered-solid-fuel flow channel 2, the air flow channels (11 to 13) and flame. This may raise the temperature of flame formed by the powdered solid fuel and, further, may cause difficulty in controlling the shape of flame, which may degrade the quality of the produced cement clinker.

The swirl angle of first swirl inner flows (air flows from the first air flow channel 11) caused by the swirl vane 11a is preferably set to be 30 degrees to 50 degrees. If the swirl angle of the first swirl inner flows is less than 30 degrees, this induces insufficient mixture of the powdered solid fuel ejected from the powdered-solid-fuel flow channel 2 with the first swirl inner flows. This may degrade the quality of the produced cement clinker or may cause difficulty in sufficiently reducing NOx in the exhaust gas. On the other hand, if the aforementioned swirl angle exceeds 50 degrees, this induces too intense mixture thereof with powdered-solid-fuel flows, which may cause difficulty in controlling the shape of flame, thereby degrading the quality of the produced cement clinker.

Further, in the 4-channel type burner device, the swirl angle of first swirl outer flows (air flows from the third air flow channel 13) caused by the swirl vane 13a is preferably set to be 1 degree to 50 degrees. If the swirl angle of first swirl outer flows is less than 1 degree, this induces insufficient mixture of the powdered solid fuel ejected from the powdered-solid-fuel flow channel 2 with the first swirl outer flows. This may degrade the quality of the produced cement clinker or may cause difficulty in sufficiently reducing NOx in the exhaust gas. On the other hand, if the aforementioned swirl angle exceeds 50 degrees, this induces too intense mixture thereof with powdered-solid-fuel flows, which may cause difficulty in controlling the shape of flame, thereby degrading the quality of the produced cement clinker.

In view of stably forming reduction areas in flame, it is preferable to lower the amounts of primary air ($m^3N/min$) in the respective air flow channels (2, 4, 11, 12, 13), as much as possible. However, if the amounts of primary air are excessively lowered, this changes the shape of flame, which shifts high-temperature areas to the inside of the cement kiln, thereby degrading the quality of the produced cement clinker. In the examples represented in Tables 1 and 2, air flows from the powdered-solid-fuel flow channel 2 and first straight outer flows (air flows from the second air flow channel 12) are made larger, in amount (amounts of primary air), than the other air flows. This is for smoothly introducing the secondary air at a higher temperature into flame for rapidly raising the temperatures of the pulverized coal C (the powdered solid fuel) and the combustible solid waste RF, in order to facilitate discharge of volatile components for stabilizing flame reduction states.

As described above, according to the present invention, it is possible to optimize operation conditions for the cement kiln burner device 1 in a shorter time, by setting the swirl angles of the respective swirl vanes (2a, 11a) in the powdered-solid-fuel flow channel 2 and the first air flow channel 11 (first swirl inner flows) within the ranges illustrated in FIG. 2 before operation of the cement kiln burner device 1 and, further, by setting the burner-tip flow velocities and the amounts of primary air in the respective air flow channels (2, 11, 12) within the ranges illustrated in Table 2 through adjustments of the amounts of primary air flowing through the air pipes (22, 31, 32) by the blowing fans (F1, F2, F3), during operation of the cement kiln burner device 1.

Similarly, in the case of the 4-channel type burner device 1, it is possible to optimize operation conditions for the cement kiln burner device 1 in a shorter time, by setting the swirl angles of the respective swirl vanes (2a, 11a, 13a) in the powdered-solid-fuel flow channel 2, the first air flow channel 11 (first swirl inner flows) and the third air flow channel 13 (first swirl outer flows) within the ranges illustrated in Table 1 before operation and, further, by setting the burner-tip flow velocities and the amounts of primary air in the respective air flow channels (2, 11, 12, 13) within the ranges illustrated in Table 1, through adjustments of the amounts of primary air flowing through the air pipes (22, 31, 32, 33) by the blowing fans (F1, F2, F3, F4), during operation of the cement kiln burner device 1.

Next, there will be described combustion simulations regarding the rate of landing combustion (the kiln inside falling rate) of combustible solid waste RF (in this case, non-rigid plastic), in cases of varying the burner-tip flow velocities (m/s) in the respective opening portions (12-1, 12-2, ..., 12-8) constituting the divisional injection ports in the second air flow channel 12 positioned in the outermost side.

More specifically, investigations were conducted through simulations (software: FLUENT manufactured by ANSYS JAPAN K.K.), for determining whether non-rigid plastics with a particle size of 30 mm were burned out within flame or in landing combustion, in cases of varying the burner-tip flow velocities in the respective opening portions (12-1, 12-2, ..., 12-8) constituting the divisional injection ports in the second air flow channel 12 positioned in the outermost side, while fixing burner combustion conditions as will be described later. Further, the simulations were conducted for cases where the cement kiln burner device 1 was of the 4-channel type (FIG. 1) and of the 3-channel type (FIG. 4), under a condition where a constant total amount of primary air was supplied to the second air flow channel 12 positioned in the outermost side, through the air pipe 32, by the blowing fan F2.

<Burner Combustion Conditions>

The amount of pulverized coal C combusted: 15 t/hour

The amount of waste plastic (non-rigid plastic) as combustible solid waste RF which was processed: 3.0 t/hour The size of waste plastic as combustible solid waste RF: a circular sheet shape with a diameter of 30 mm which was formed by punching a sheet with a thickness of 0.5 mm The burner-tip flow velocity, the primary air ratio and the swirl angle of powdered-solid-fuel flows (which were common to both the 4-channel type burner and the 3-channel type burner): 50 m/s, 5 vol %, 5 degrees The burner-tip flow velocity, the primary air ratio and the swirl angle of first swirl inner flows (which were common to both the 4-channel type burner and the 3-channel type burner): 150 m/s, 2 vol %, 40 degrees The burner-tip flow velocity, the primary air ratio and the swirl angle of first swirl outer flows (which were only for the 4-channel type burner): 100 m/s, 2 vol %, 30 degrees The primary air ratio of first straight outer flows positioned in the outermost side (which was common to both the 4-channel type burner and the 3-channel type burner): 6 vol %

The burner-tip flow velocity and the primary air ratio of combustible-solid-waste flows (which were common to both the 4-channel type burner and the 3-channel type burner): 50 m/s, 2 vol %

The amount and the temperature of secondary air: 150000 Nm3/hour, 800 degrees C.

The diameter of the burner tip in the cement kiln burner device 1: 700 mm

The results of the simulations are illustrated in the following Table 3 and FIG. 7 regarding the 4-channel type burner and, further, are illustrated in the following Table 4 and FIG. 8 regarding the 3-channel type burner.

More specifically, regarding the 4-channel type burner, simulations were conducted, under 5 standards S41 to S45 having different combinations of burner-tip flow velocities of respective air flows ejected from the respective opening portions (12-1, 12-2, ..., 12-8). Further, under the standard S41, the burner-tip flow velocities of respective air flows ejected from the respective opening portions (12-1, 12-2, ..., 12-8) were equal to each other, thereby simulating the structure of the second air flow channel 12 which is not divided.

Further, regarding the 3-channel type burner, simulations were conducted, under 6 standards S31 to S36 having different combinations of burner-tip flow velocities of respective air flows ejected from the respective opening portions (12-1, 12-2, ..., 12-8). Further, under the standard S31, the burner-tip flow velocities of respective air flows ejected from the respective opening portions (12-1, 12-2, ..., 12-8) were equal to each other, thereby simulating the structure of the second air flow channel 12 which is not divided.

Further, in case of any number of channels, the simulations were conducted assuming that the partition portions 12c constituting the boundaries between the respective opening portions (12-1, 12-2, ..., 12-8) had a thickness (a circumferential length) equal to or less than 5% of the circumferential length of each of the opening portions (12-1, 12-2, ..., 12-8). Namely, when primary air was ejected at the same flow rate from all the opening portions (12-1, 12-2, . . . , 12-8) as under the standards S41 and S31, intermittent air flows could not be realized, since the partition portions 12c had a much smaller thickness than the circumferential length of each of the opening portions (12-1, 12-2, . . . , 12-8), even though there existed the partition portions 12c constituting the boundaries between the respective opening portions.

S36. This also reveals that the kiln inside falling rate of the combustible solid waste RF is varied, by causing respective air flows ejected from the respective opening portions (12-1, 12-2, . . . , 12-8), which are the divisions of the second air flow channel 12, to have different combinations of burner-tip flow velocities.

TABLE 3

| | 4 channel type burner (FIGS. 1 and 2) | | | | | | | | |
|---|---|---|---|---|---|---|---|---|---|
| | Burner-tip flow velocity (m/s) | | | | | | | | |
| Standard | Opening portion 12-1 | Opening portion 12-2 | Opening portion 12-3 | Opening portion 12-4 | Opening portion 12-5 | Opening portion 12-6 | Opening portion 12-7 | Opening portion 12-8 | Kiln inside falling rate of non-rigid plastic (mass %) |
| S41 | 150 | 150 | 150 | 150 | 150 | 150 | 150 | 150 | 22 |
| S42 | 90 | 90 | 210 | 210 | 210 | 210 | 90 | 90 | 13 |
| S43 | 0 | 0 | 300 | 300 | 300 | 300 | 0 | 0 | 0 |
| S44 | 210 | 90 | 210 | 90 | 210 | 90 | 210 | 90 | 9 |
| S45 | 90 | 210 | 210 | 210 | 210 | 90 | 90 | 90 | 5 |

TABLE 4

| | 3 channel type burner (FIGS. 4 and 2) | | | | | | | | |
|---|---|---|---|---|---|---|---|---|---|
| | Burner-tip flow velocity (m/s) | | | | | | | | |
| Standard | Opening portion 12-1 | Opening portion 12-2 | Opening portion 12-3 | Opening portion 12-4 | Opening portion 12-5 | Opening portion 12-6 | Opening portion 12-7 | Opening portion 12-8 | Kiln inside falling rate of non-rigid plastic (mass %) |
| S31 | 150 | 150 | 150 | 150 | 150 | 150 | 150 | 150 | 36 |
| S32 | 90 | 90 | 210 | 210 | 210 | 210 | 90 | 90 | 24 |
| S33 | 0 | 0 | 300 | 300 | 300 | 300 | 0 | 0 | 10 |
| S34 | 0 | 0 | 400 | 400 | 400 | 400 | 0 | 0 | 0 |
| S35 | 210 | 90 | 210 | 90 | 210 | 90 | 210 | 90 | 18 |
| S36 | 90 | 210 | 210 | 210 | 210 | 90 | 90 | 90 | 23 |

Figure 7:
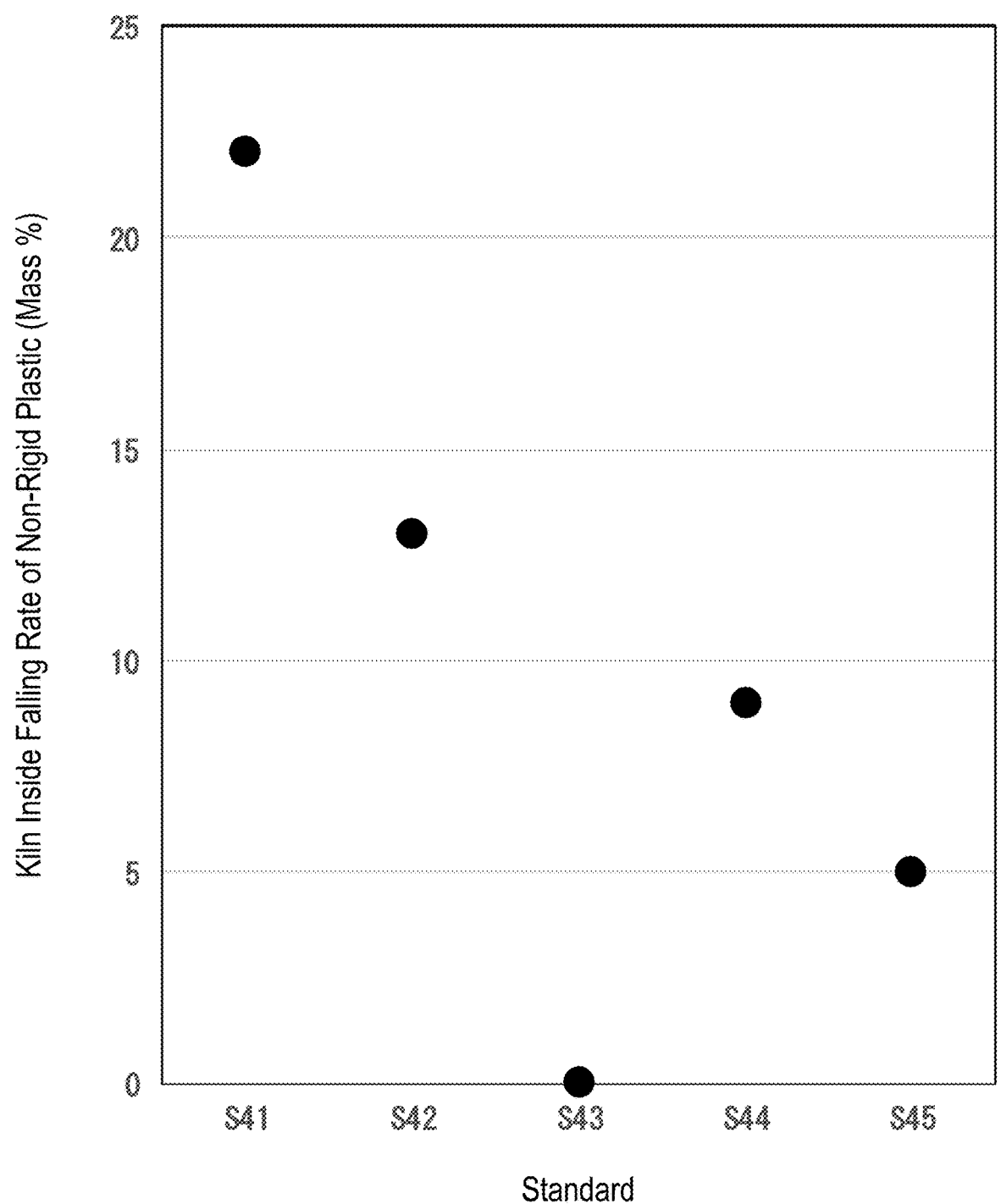
FIG. 7 is a graph illustrating results of combustion simulations regarding the rate of landing combustion (the kiln inside falling rate) of combustible solid waste, with a 4-channel type cement kiln burner device, and a method for operating the cement kiln burner device, according to the present invention.
Figure 8:
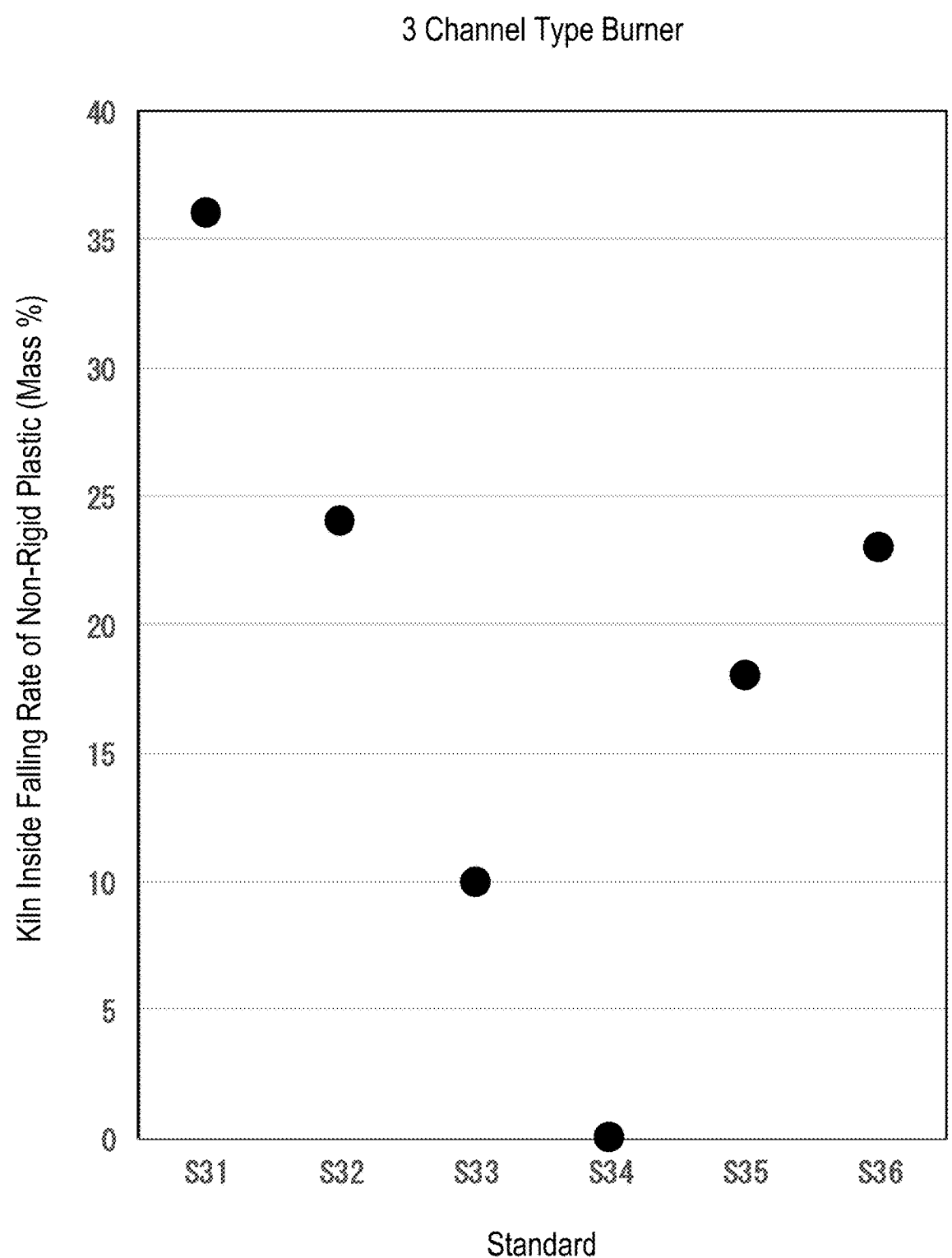
FIG. 8 is a graph illustrating results of combustion simulations regarding the rate of landing combustion (the kiln inside falling rate) of combustible solid waste, with a 3-channel type cement kiln burner device, and a method for operating the cement kiln burner device, according to the present invention.

According to the results in Table 3 and FIG. 7, and Table 4 and FIG. 8, it is revealed that, even when the cement kiln burner device 1 was of the 4-channel type or of the 3-channel type, under the standards (S42 to S45, S32 to S36) having the different combinations of burner-tip flow velocities of respective air flows ejected from the respective opening portions (12-1, 12-2, . . . , 12-8), which were the divisions of the second air flow channel 12, the kiln inside falling rate of the combustible solid waste RF could be reduced, in comparison with under the standards (S41, S31) where the burner-tip flow velocities of respective air flows ejected from all the opening portions (12-1, 12-2, . . . , 12-8) were equal to each other. This reveals that, with the cement kiln burner device and the method for operating the cement kiln burner device according to the present invention, it is possible to effectively burn out combustible solid wastes RF with particle sizes of up to 30 mm in burner flame, without causing landing combustion thereof.

Further, from the comparison between the standards S42, S44 and S45, it can be seen that the kiln inside falling rate of the combustible solid waste RF was varied, even though the number of opening portions caused to have a burner-tip flow velocity of 210 m/s as a flow rate is the same as the number of opening portions caused to have a burner-tip flow velocity of 90 m/s as a flow rate. Regarding the case where the number of channels was 3, the same results can be seen from the comparison between the standards S32, S35 and Namely, it can be seen that, with the present invention, it is possible to easily perform adjustments for providing optimum flame, according to the cement-kiln operating environments such as the burner combustion state, and the types of fuels.

<Other Embodiments>

Hereinafter, other embodiments will be described.

(1) While, in the aforementioned embodiment, there has been described a case where the plural opening portions (12-1, 12-2, . . . , 12-8) constituting the second air flow channel 12 all have the same center angle Φ, they can also include an opening portion having a different center angle Φ.

Further, in the aforementioned embodiment, there has been described a case where the second air flow channel 12 is divided into eight opening portions (12-1, 12-2, . . . , 12-8) in the circumferential direction. However, in view of causing a single opening portion to eject air flows at a flow rate of zero for forming intermittent straight outer flows, it is necessary only that the second air flow channel 12 is divided into at least four or more opening portions. Namely, the aforementioned number of the divisions is required to be four or more, and the aforementioned number of the divisions is more preferably eight or more and is furthermore preferably twelve or more. However, if the number of the divisions is too large, this may complicate the contents of control or may increase the device scale, since there is a need for providing gas valves and branch pipes, according to the number of the opening portions. In view of this circumstance, the aforementioned number of divisions is preferably equal to or less than 16.

(2) While, in the example of FIG. 3, there is illustrated a case where the cement kiln burner system 20 includes five blowing fans (F1 to F5), this aspect is merely an example and is not intended to restrict the present invention to this structure. For example, in the 4-channel type burner, there can be provided a common blowing fan as blowing fans (F3 and F4) for directing air flows to the first air flow channel 11 and the third air flow channel 13.

(3) While, in the aforementioned embodiment, there has been described a case where the degrees of opening of the gas valves (B1 to B8) are adjusted, as a method for controlling the flow velocities of air flows ejected from the respective opening portions (12-1, 12-2, . . . , 12-8), but this is merely an example and various types of methods can be employed.

(4) In the cement kiln burner device 1 according to the aforementioned embodiment, there can be further provided a fourth air flow channel 14 having means for straightly forwarding air flows, such that the fourth air flow channel 14 is placed outside the powdered-solid-fuel flow channel 2 and inside the second air flow channel 12 (see FIG. 9). FIG. 9 illustrates the structure of the cement kiln burner device 1 illustrated in FIG. 4 which is further provided with the fourth air flow channel 14, in the same manner as that of FIG. 4. Air flows ejected from the fourth air flow channel 14 form straight air flows (which will be referred to as "second straight outer flows", hereinafter), which are positioned outside the powdered-solid-fuel flows ejected from the powdered-solid-fuel flow channel 2.

Similarly to the second air flow channel 12, the fourth air flow channel 14 is partitioned in the circumferential direction by partition portions 14c into plural opening portions (14-1, 14-2, . . . , 14-8) which form ports for injecting air flows (see FIG. 10). The fourth air flow channel 14 can be adapted such that air flows ejected from the respective plural opening portions (14-1, 14-2, . . . , 14-8), which are the divisions of the fourth air flow channel 14, can be controlled in flow rate, independently of each other, for each of the opening portions (14-1, 14-2, . . . , 14-8). This structure enables adjusting air-flow supply conditions with higher flexibility. Incidentally, the number of the divisions of the fourth air flow channel 14 is required to be four or more, and the number of the divisions of the fourth air flow channel 14 is more preferably eight or more, and is furthermore preferably twelve or more, similarly to the second air flow channel 12. However, if the number of the divisions is too large, this may complicate the contents of control or may increase the device scale, since there is a need for providing gas valves and branch pipes, according to the number of the opening portions. Therefore, the aforementioned number of divisions is preferably equal to or less than 16.

Further, in FIG. 9, there is illustrated a case where the number of the divisions of the fourth air flow channel 14 is eight, which is the same as the number of the divisions of the second air flow channel 12. However, the number of the divisions of the fourth air flow channel 14 can be different from the number of the divisions of the second air flow channel 12. Namely, the center angle Φ2 of each of the opening portions (14-1, 14-2, . . . ), which are the divisions of the fourth air flow channel 14, can be different from the center angle Φ of each of the opening portions (12-1, 12-2, . . . ), which are the divisions of the second air flow channel 12. Further, the respective opening portions (14-1, 14-2, . . . ), which are the divisions of the fourth air flow channel 14, can have different center angles Φ2.

Further, in FIG. 9, as illustrated in the lateral cross-sectional view of (a), in an XY plane, the positions of the respective opening portions (12-1, 12-2, . . . , 12-8) which are the divisions of the second air flow channel 12 and the positions of the respective opening portions (14-1, 14-2, . . . , 14-8) which are the divisions of the fourth air flow channel 14 are placed at different rotational angles when being represented on two-dimensional polar coordinates having a center at the axis center O. With this placement, it is possible to adjust air-flow supply conditions with higher flexibility. However, the rotational angles may be completely coincident with each other.

Further, although not illustrated, in the cement kiln burner device 1 illustrated in FIG. 1, the aforementioned fourth air flow channel 14 for forming second straight outer flows may be provided between the third air flow channel 13 for forming first swirl outer flows and the second air flow channel 12 for forming first straight outer flows in the radial direction.

DESCRIPTION OF REFERENCE SIGNS

1 Cement kiln burner device
2 Powdered-solid-fuel flow channel
2a Swirl vane provided in powdered-solid-fuel flow channel
3 Oil flow channel
5 Combustible-solid-waste flow channel
9 Axis
11 First air flow channel
11a Swirl vane provided in first air flow channel
12 Second air flow channel
12-1, 12-2, 12-3, 12-4, 12-5, 12-6, 12-7, 12-8 Opening portion which is division of second air flow channel
12c Partition portion
13 Third air flow channel
13a Swirl vane provided in third air flow channel
14 Fourth air flow channel
14-1, 14-2, 14-3, 14-4, 14-5, 14-6, 14-7, 14-8 Opening portion which is division of fourth air flow channel
20 Cement kiln burner system
22 Pulverized-coal transfer pipe
24 Combustible-solid-waste transfer pipe
31, 32, 33 Air pipe
321, 322, 323, 324, 325, 326, 327, 328 Branch pipe communicated with air pipe 32
A Combustion air
C Pulverized coal
F1, F2, F3, F4, F5 Blowing fan
RF Combustible solid waste

What is claimed is:

1. A cement kiln burner device including a plurality of flow channels partitioned by a plurality of concentric cylindrical members, the cement kiln burner device comprising:

a powdered-solid-fuel flow channel including means for swirling a powdered-solid-fuel flow;

a first air flow channel placed inside the powdered-solid-fuel flow channel to be adjacent to the powdered-solid-fuel flow channel, the first air flow channel including means for swirling an air flow;

a second air flow channel placed in an outermost side outside the powdered-solid-fuel flow channel, the second air flow channel including means for straightly forwarding an air flow;

a combustible-solid-waste flow channel placed inside the first air flow channel, wherein the second air flow channel is divided in a circumferential direction into four or more opening portions adapted to form ports for injecting air flows, and is configured to control flow rates of the air flows ejected from the opening portions, independently for each opening portion;

a third air flow channel placed outside the powdered-solid-fuel flow channel and inside the second air flow channel, the third air flow channel including means for swirling an air flow; and a fourth air flow channel placed outside the third air flow channel and inside the second air flow channel, the fourth air flow channel including means for straightly forwarding an air flow, wherein the fourth air flow channel is divided in the circumferential direction into four or more opening portions adapted to form ports for injecting air flows, and is configured to control flow rates of the air flows ejected from the opening portions, independently for each opening portion.

2. The cement kiln burner device according to claim 1, when the second air flow channel is taken along a plane orthogonal to an axis center, a center angle formed by connecting opposite ends, in the circumferential direction, of each opening portion included in the second air flow channel and the axis center is identical for each opening portion.

3. A method for operating the cement kiln burner device according to claim 2, comprising ejecting an air flow from each opening portion included in the second air flow channel at a flow velocity of 0 m/s to 400 m/s (except when all air flows ejected from all the opening portions have a flow velocity of 0 m/s).

4. A method for operating the cement kiln burner device according to claim 1, comprising ejecting an air flow from each opening portion included in the second air flow channel at a flow velocity of 0 m/s to 400 m/s (except when all air flows ejected from all the opening portions have a flow velocity of 0 m/s).

* * * * *

UNITED STATES PATENT AND TRADEMARK OFFICE
CERTIFICATE OF CORRECTION

| | |
|---|---|
| PATENT NO. | : 11,306,915 B2 |
| APPLICATION NO. | : 16/643155 |
| DATED | : April 19, 2022 |
| INVENTOR(S) | : Yuya Sano |

It is certified that error appears in the above-identified patent and that said Letters Patent is hereby corrected as shown below:

In the Specification

Column 18, Line 26, delete "5" and insert -- 4 --.

Signed and Sealed this
Sixteenth Day of August, 2022

Katherine Kelly Vidal
*Director of the United States Patent and Trademark Office*